April 9, 1935.  F. A. HALLECK  1,996,762

VALVE MECHANISM

Filed Dec. 26, 1931

Inventor:
Frank A. Halleck.
by Louis A. Maxom.
Atty.

Patented Apr. 9, 1935

1,996,762

UNITED STATES PATENT OFFICE 1,996,762

VALVE MECHANISM

Frank A. Halleck, Chicago, Ill., assignor to Sullivan Machinery Company, a corporation of Massachusetts Application December 26, 1931, Serial No. 583,373

29 Claims. (Cl. 230—231)

My invention relates to valve mechanisms and more particularly to automatic flow-controlled valve mechanisms for pumps or air compressors.

An object of my invention is to provide an improved valve mechanism. Another object of my invention is to provide an improved valve mechanism of the type in which the inlet and discharge mechanisms are arranged coaxially with the cylinder. A further object of my invention is to provide an improved mechanism in which upon removal of the cylinder head, access to the valves may be readily attained. A still further object of my invention is to provide an improved valve mechanism for a compressor whose parts are so arranged that access to the valve mechanisms may be effected without disturbance of the air delivery connections. A still further object of my invention is to provide an improved valve mechanism of the type of which the inlet and discharge mechanisms are arranged coaxially with the cylinder with the valve seats thereof substantially in a common transverse plane. Yet another object of my invention is to provide an improved pumping or compressing mechanism having an improved cylinder, cylinder head and valve arrangement. Other objects of the invention will hereinafter more fully appear.

Figure 1:
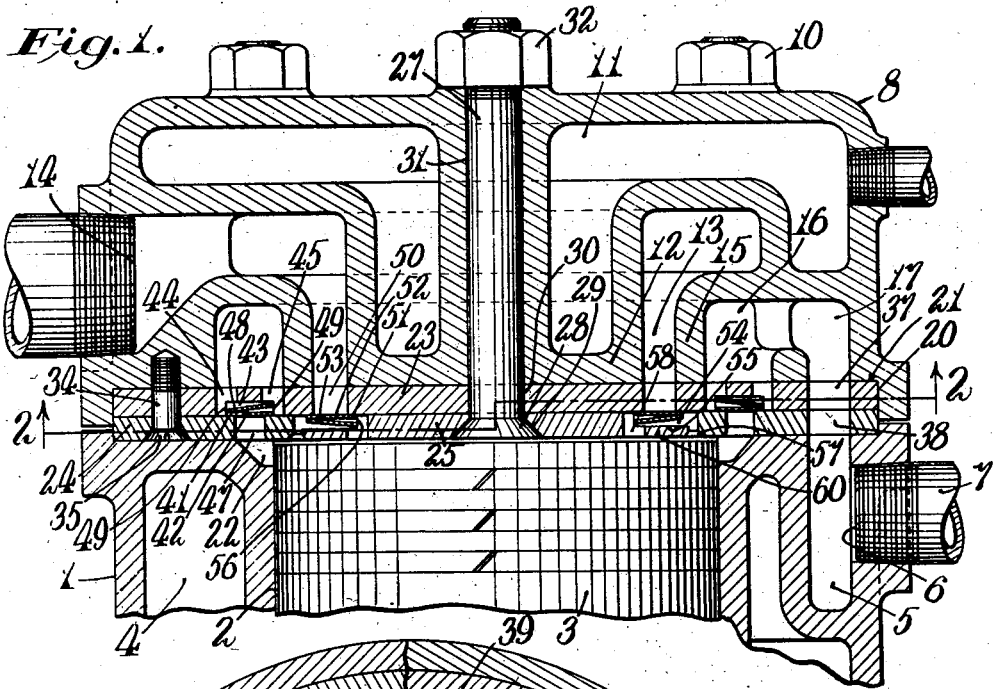
Figure 2:
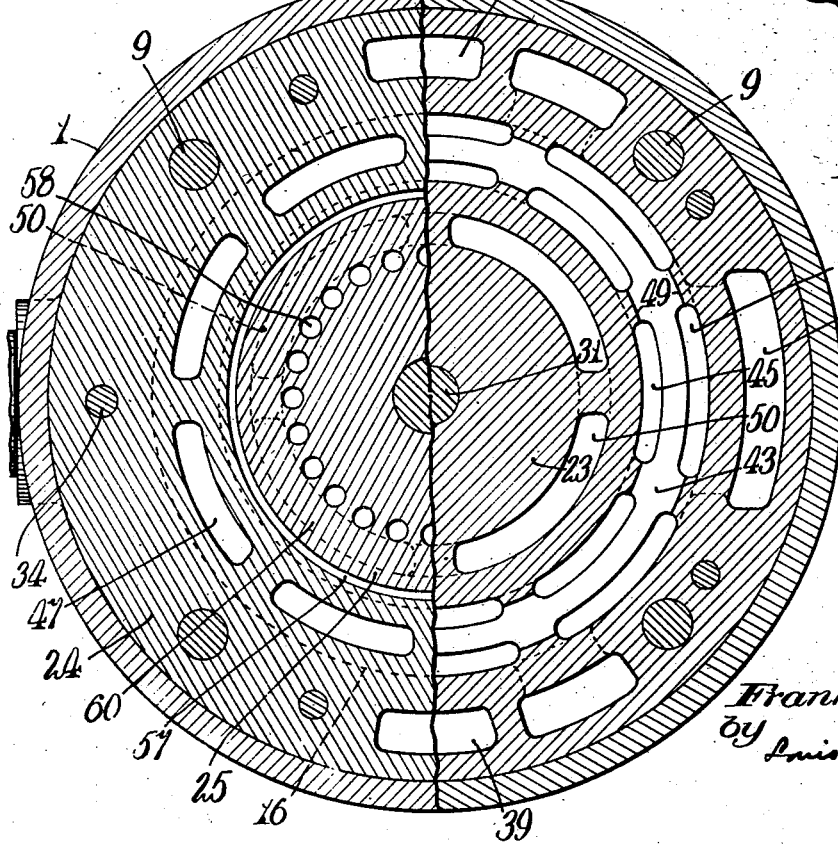

In the accompanying drawing, in which one embodiment of the invention is shown for purposes of illustration, Fig. 1 is a special section through the head end of a pump cylinder in which the illustrative form of my invention is embodied;

Fig. 2 is a transverse section on the planes of the broken line 2—2 of Fig. 1.

For purposes of illustration I have shown my improved pump valve mechanism arranged for use with an air compressor, the latter having a cylinder 1, in whose bore 2 a piston 3 is reciprocable. This cylinder may be the only cylinder of the compressor, or may, for example be one of a series of radially extending cylinders of a radial type compressor. The cylinder 1 has a water jacket 4, and, adjacent one side thereof, and for the pumped fluid, a discharge space 5 and port 6 with which a discharge line 7 is suitably connected.

The cylinder 1 carries a cylinder head 8 and this is connected to the cylinder by any suitable means, herein by studs 9 and nuts 10. The cylinder head 6 has a water jacket formed therein as shown at 11, and has, surrounding a central hollow water cooled boss portion 12, an annular supply or inlet space 13 to which an intake connection 14 leads. Surrounding the inlet space 13 and spaced from the latter by an annular wall portion 15 is an annular discharge cavity 16; and a discharge connection space 17 is arranged in suitable position to connect the discharge cavity 16 and the discharge space 5.

The abutting ends of the cylinder member 1 and the head 8 are recessed to provide a chamber 20 for a valve mechanism 21, and the outer end of the cylinder is counterbored to provide an annular air flow space 22. The valve mechanism 21 comprises a plurality of cage members, herein in the form of plates and herein three in number, one of these plates 23 extending continuously for the full width of the valve mechanism and lying adjacent the cylinder head, while the other two plates 24 and 25 are concentrically arranged, with the plate 24 surrounding the plate 25, and both plates in contact with the plate 23. The plate 25 and the plate 23 are held together, and to the cylinder head, by a bolt 27 whose head 28 is received in a countersunk recess 29 in the plate 25, and whose shank extends through an opening 30 at the center of the plate 23 and through a bore 31 in the boss portion 12 of the cylinder head and is provided with a nut 32 outside of the cylinder head and engaging the outer surface of the latter. The plate 24 is held to the plate 23 and to the cylinder head by a series of machine screws 34 having countersunk heads 35. The plates 23 and 24 are provided with alined passages 37 and 38 which serve to connect the discharge passage 17 with the discharge space 5. The water jacket 4 of the cylinder and the water jacket 11 of the cylinder head are connected by passages 39 extending through the valve plates 23 and 24.

The valve plate 24 provides a valve seat 41 for a discharge valve 42, which is herein annular in form and movable axially of the cylinder during opening and closing within an annular valve pocket 43 formed in the plate 23. The pocket 43 is connected by coaxial annular series of arcuate flow passages 44 and 45 with the discharge cavity 16. The member 24 is traversed by arcuate ports 47 arranged in annular series opening at their outer ends through the valve seat surface 41 and communicating at their inner ends with the counterbored space 22. A suitable valve spring, herein an annular transversely bowed spring 48, normally yieldably maintains the valve closed. It will be noted that the complete discharge valve mechanism is housed in a chamber formed by the plates 23 and 24, and that separation of these plates from each other exposes the valve and valve spring and also the valve seat of the discharge valve mechanism. Obviously, the valve 42 and valve spring 48 are guided by the walls of the chamber 43 during opening and closing movement, there being guide surfaces 49 provided between the adjacent ends of the arcuate ports 44 and 45, whose inner ends, as it were, widen the valve pocket 43. It will be noted that a large discharge area is assured by the location of the discharge valve actually, in the illustrative embodiment, in a pocket whose outer circumference exceeds the circumference of the cylinder bore.

Referring to the inlet valve mechanism it will be noted that the plate 23 is provided, to the inside of the discharge mechanism, with a circular series of arcuate inlet ports 50 communicating, at their outer ends, with the intake space 13 and opening through a valve seat surface 51 formed on the cylinder side of the plate 23. With the valve seat 51 an annular valve 52 cooperates, and this valve is normally yieldably maintained seated by a spring 53 which, like the discharge valve spring, may well be of an annular transversely bowed form. The spring and valve are maintained in position and guided during opening and closing movements by the member 25 which is cut away peripherally to form an annular space 54, within which the valve and valve spring are received, a wall 55 of this space providing a guard surface and a wall 56 proving a guide surface for the valve and spring. The space 54 is connected with the cylinder bore by an annular opening 57 lying between the outer periphery of the plate 25 and the inner periphery of the plate 24, and a free air flow is further established by a series of axially extending holes 58 formed in a circular series and extending through the plate member 25 in such manner as partially to cut away the guiding wall 56 and permit flow through the inner side of the flange portion 60 which affords the guard surface 55.

It will be clearly apparent that the inlet valve mechanism may be disassembled by the removal of the bolt 27 without, in any way, disturbing the assemblage of the discharge valve structure. It will be noted, moreover, that the inlet valve mechanism lies within a cylindrical space inclosed within a cylinder produced by the extension of the inner cylindrical surface of the cylinder bore, while the discharge valve mechanism lies substantially wholly outside such surface. It will be noted that the valve mechanism is completely protected by its enclosure in the chamber between the cylinder and cylinder head; that access thereto may be readily attained, however, by removing the nuts 10 from the studs 9; that in the removal of the cylinder head which would be the next step, it is unnecessary to interfere with the discharge connections 7 for the compressor cylinders; that either valve mechanism may be inspected or overhauled without, in any way, disturbing the other; that the valve mechanism comprises a single plate providing a valve seat for one valve mechanism and a valve chamber for another valve mechanism, and having associated with it, plates each of which individually completes one of the two valve mechanisms. It will be evident that the structure is simple, rugged and obviously efficient.

While I have, in this application, specifically described one form which the invention may assume in practice, it will be understood that this form of the same is shown for purposes of illustration and that the invention may be modified and embodied in various other forms without departing from its spirit or the scope of the appended claims.

Cross reference is hereby made to my application Ser. No. 583,374 of even filing date herewith.

What I claim as new and desire to secure by Letters Patent is:

1. In combination, in a valve mechanism, a cage member providing a valve seat and a spaced valve pocket, valve devices associated respectively with said seat and pocket, and separate cage members arranged at the same side of said first mentioned cage member and one providing a valve guard for the valve device associated with said valve seat and the other providing a valve seat for the valve device associated with said valve pocket.

2. In a valve mechanism, in combination, coaxial inlet and discharge valve mechanisms comprising a circular plate and a pair of cooperating plates each contacting with the first mentioned plate and one of which surrounds the other, an inlet valve mechanism between one of the last mentioned plates and the first mentioned plate, and a discharge valve mechanism disposed between the other of said last mentioned plates and said first mentioned plate.

3. In a valve mechanism, in combination, coaxial inlet and discharge valve mechanisms comprising a circular plate and a pair of cooperating plates each contacting with the first mentioned plate and one of which surrounds the other, an inlet valve mechanism between one of the last mentioned plates and the first mentioned plate, and a discharge valve mechanism disposed between the other of said last mentioned plates and said first mentioned plate, and means permitting complete access to either of said valve mechanisms by the removal of only one of said last mentioned plates.

4. In a valve mechanism, in combination, a plate having an annular series of ports therein, a guard plate secured to said first mentioned plate adjacent the center thereof and having a portion overlying said ports, valve means cooperating with said ports and positioned by said guard plate, another plate surrounding the second mentioned plate, and valve means between said last mentioned plate and said first mentioned plate.

5. In combination, in a valve mechanism, a plate providing a valve seat and a spaced valve pocket, said seat and pocket being coaxially arranged, valve devices associated respectively with said seat and pocket, and separate plates, one providing a valve guard for the valve device associated with said valve seat and the other providing a valve seat for the valve device associated with said valve pocket.

6. In a valve mechanism, a plate having a valve seat thereon spaced inwardly from the edge thereof, a second plate having an outwardly extending flange and mounted on said first mentioned plate, valve means between said flange and valve seat, coaxial valve mechanism carried in part by said first mentioned plate and in part by a third plate surrounding said second mentioned plate, said third plate being spaced from said second plate to provide a flow passage for fluid passing through said valve seat.

7. In combination, in a valve mechanism, a cage member providing a valve seat on one side thereof and a spaced valve pocket, the pocket opening through that side of said cage member on which said seat is formed, valve devices associated with said seat and pocket, and separate cage members, one providing a valve guard for the valve device associated with said valve seat and the other providing a valve seat for the valve device associated with said valve pocket, said valve seats both being plane and the plane of one of said seats being parallel to a plane parallel to the plane of the other seat.

8. In combination, a cylinder, a plate extending transversely of the cylinder and having a valve seat at the side thereof nearer the cylinder, said plate having also a valve pocket spaced from the valve seat, valve devices associated respectively with said seat and pocket, and separate plates, one providing a valve guard for the valve device associated with said valve seat and the other providing a valve seat for the valve device associated with said valve pocket.

9. In a valve mechanism, a cage member having a valve seat thereon, a second cage member cut away to form a valve receiving recess and arranged with said recess juxtaposed to said seat, a valve movable in said recess and cooperating with said seat, a third cage member spaced from the second cage member to provide a flow passage for fluid passing through the valve seat, and a second valve, said first and third cage members cooperating to position said second valve and one providing a seat therefor and the other a valve receiving pocket spaced inward from its periphery.

10. In combination, in a valve mechanism, a cage member providing a valve seat on one side thereof and a spaced valve pocket, the pocket opening through that side of said cage member on which said seat is formed, valve devices associated with said seat and pocket, and separate cage members, one providing a valve guard for the valve device associated with said valve seat and the other providing a valve seat for the valve device associated with said valve pocket, said valve seats lying substantially in the same plane.

11. In combination, in a compressor, a cylinder member having a bore with a piston reciprocable therein, a cylinder head, and valve means arranged between the adjacent surfaces of the cylinder member and head and including a flat plate having an annular valve receiving pocket opening through one face thereof, circularly arranged port means traversing the plate and terminating on the last mentioned face of said plate in an annular valve seat coaxial with but struck on smaller radii than said pocket, plate means associated with said first mentioned plate and traversed by ports surrounded by a seat disposed opposite the mouth of said pocket, said plate means also providing a pocket opposed to said first mentioned seat, said seats lying in substantially the same plane, and valves and springs in said pockets.

12. In combination, in a compressor, a cylinder member having a bore with a piston reciprocable therein, a cylinder head, and valve means arranged between the adjacent surfaces of the cylinder member and head and including a flat plate having an annular valve receiving pocket opening through one face thereof, circularly arranged port means traversing the plate and terminating on the last mentioned face of said plate in an annular valve seat coaxial with but struck on smaller radii than said pocket, plate means associated with said first mentioned plate and traversed by ports surrounded by a seat disposed opposite the mouth of said pocket, said plate means also providing a pocket opposed to said first mentioned seat, said seats lying in substantially the same plane, and valves and annular transversely bowed springs in said pockets.

13. In combination, in a compressor, a cylinder member having a bore with a piston reciprocable therein, a cylinder head, and valve means arranged between the adjacent surfaces of the cylinder member and head and including a flat plate having an annular valve receiving pocket opening through one face thereof, circularly arranged port means traversing the plate and terminating on the last mentioned face of said plate in an annular valve seat coaxial with but struck on smaller radii than said pocket, plate means associated with said first mentioned plate and traversed by ports surrounded by a seat disposed opposite the mouth of said pocket, said plate means also providing a pocket opposed to said first mentioned seat and of uniform depth throughout its circumference, said seats lying in substantially the same plane, and valves and springs in said pockets.

14. In combination, in a compressor, a cylinder member having a bore with a piston reciprocable therein, a cylinder head, and valve means arranged between the adjacent surfaces of the cylinder member and head and including a flat plate having an annular valve receiving pocket opening through one face thereof, the outer circumference of said pocket being at least as large as the circumference of the cylinder bore, circularly arranged port means traversing the plate and terminating on the last mentioned face of said plate in an annular valve seat coaxial with but struck on smaller radii than said pocket, plate means associated with said first mentioned plate and traversed by ports surrounded by a seat disposed opposite the mouth of said pocket, said plate means also providing a pocket opposed to said first mentioned seat, said seats lying in substantially the same plane, and valves and springs in said pockets.

15. In combination, in a valve mechanism, a cage member providing a valve seat on one side thereof and a spaced valve pocket, the pocket opening through that side of said cage member on which said seat is formed, valve devices associated with said seat and pocket, and separate cage members, one providing a valve guard for the valve device associated with said valve seat and the other providing a valve seat—the entire seat—for the valve device associated with said valve pocket, said valve seats both being plane and the plane of one of said seats being parallel to a plane parallel to the plane of the other seat.

16. In combination, a cylinder, a plate extending transversely of the cylinder and having a valve seat at the side thereof nearer the cylinder, said plate having also a valve pocket spaced from the valve seat, valve devices associated respectively with said seat and pocket, and separate plates, one providing a valve guard for the valve device associated with said valve seat and the other providing a valve seat—the entire seat—for the valve device associated with said valve pocket.

17. In combination, in a valve mechanism, a cage member providing a valve seat on one side thereof and a spaced valve pocket, the pocket opening through that side of said cage member on which said seat is formed, valve devices associated with said seat and pocket, and separate cage members, one providing a valve guard for the valve device associated with said valve seat and the other providing a valve seat—the entire seat—for the valve device associated with said valve pocket, said valve seats lying substantially in the same plane.

18. In a pump mechanism, a cylinder, a cylinder head, and coaxially arranged inlet and discharge valve mechanisms coaxial with said cylinder and arranged one within the cylindrical space enclosed within the cylinder bore extended and the other outside said space, said valve mechanisms each including a seat, valve, and cover, and being removable in their entireties upon removal of the cylinder head.

19. In a pump mechanism, in combination, a cylinder head having coaxial annular intake and discharge spaces, a cylinder, valve mechanisms controlling the flow between said cylinder and said intake and discharge spaces, and diametrically opposite intake and delivery connections leading from said spaces and one opening through a wall of said head and the other through a lateral wall of said cylinder.

20. In a pump mechanism, a cylinder having a piston therein, a cylinder head, and coaxially arranged inlet and discharge valve mechanisms coaxial with said cylinder and arranged one within the cylindrical space enclosed within the cylinder bore extended and the other outside said space, said valve mechanisms providing valves each moving to unseat in a direction in which said piston is traveling during the unseating of the valves.

21. In a pump mechanism, the combination of a water cooled cylinder head having a central water cooled boss surrounded in coaxial relation therewith by radially spaced coaxial annular intake and discharge chambers, a cylinder, and valve mechanism for controlling communication between said cylinder and said radially spaced intake and discharge chambers.

22. In combination, in a valve mechanism, a plurality of cage members cooperating to provide coaxial valve receiving pockets each having a valve seat associated therewith, one of said pockets formed by a different group of plates from the group forming the other, and valves in said pockets, said valve seats being plane and being disposed substantially in the same plane.

23. In combination, in a compressor, a cylinder member having a bore with a piston reciprocable therein, a cylinder head, and valve means arranged between the adjacent surfaces of the cylinder member and head and including a flat plate having an annular valve receiving pocket opening through one face thereof, circularly arranged port means traversing the plate and terminating on the last mentioned face of said plate in an annular valve seat coaxial with but struck on smaller radii than said pocket, plate means associated with said first mentioned plate and traversed by ports surrounded by a seat disposed opposite the mouth of said pocket, said plate means also providing a pocket opposed to said first mentioned seat, said seats lying in substantially the same plane, and valves and springs in said pockets, the springs in said pockets substantially circular in outline and having a permanent flexure.

24. In combination, in a valve mechanism, three cage members cooperating to provide a pair of coaxial valve receiving pockets each having a valve seat associated therewith, each member providing at least a part of one of the opposite walls of one of said pockets, and valves in said pockets, said valve seats being plane and being disposed substantially in the same plane.

25. In combination, in a compressor, a cylinder member having a bore with a piston reciprocable therein, a cylinder head, and valve mechanism arranged between said cylinder member and head including plates providing coaxial ported plane valve seats struck on different radii from a line including the axis of the cylinder bore, said seats oppositely facing and disposed substantially in the same plane transverse to the cylinder axis, said plates also providing coaxially arranged valve receiving pockets opposite said seats and housing annular valves respectively cooperating with said seats, and valve springs in said pockets.

26. In combination, in a compressor, a cylinder member having a bore with a piston reciprocable therein, a cylinder head, and valve mechanism arranged between said cylinder member and head including plates providing coaxial ported plane valve seats struck on different radii from a line including the axis of the cylinder bore, said seats oppositely facing and disposed substantially in the same plane transverse to the cylinder axis, said plates also providing coaxially arranged valve receiving pockets opposite said seats and housing annular valves respectively cooperating with said seats, and valve springs in said pockets, said head having an annular discharge chamber opposite to and communicating with the outer one of said valve receiving pockets and also having nearer the center of said head an inlet chamber having an annular portion opposite to and communicating with the inner one of the valve seats.

27. In combination, in a compressor, a cylinder member having a bore with a piston reciprocable therein, a cylinder head, and valve mechanism arranged between said cylinder member and head including plates providing coaxial ported plane valve seats struck on different radii from a line including the axis of the cylinder bore, said seats oppositely facing and disposed substantially in the same plane transverse to the cylinder axis, said plates also providing coaxially arranged valve receiving pockets opposite said seats and housing annular valves respectively cooperating with said seats, and valve springs in said pockets, said head having an annular discharge chamber opposite to and communicating with the outer one of said valve receiving pockets and also having nearer the center of said head an inlet chamber having an annular portion opposite to and communicating with the inner one of the valve seats, and said cylinder having a lateral discharge opening near its head end communicating with said annular discharge chamber.

28. In combination, in a compressor, a cylinder member having a bore with a piston reciprocable therein, a cylinder head, and valve mechanism arranged between said cylinder member and head including plates providing coaxial ported plane valve seats struck on different radii from a line including the axis of the cylinder bore, said seats oppositely facing and disposed substantially in the same plane transverse to the cylinder axis, said plates also providing coaxially arranged valve receiving pockets opposite said seats and housing annular valves respectively cooperating with said seats, and valve springs in said pockets, said head having an annular discharge chamber opposite to and communicating with the outer one of said valve receiving pockets and also having nearer the center of said head an inlet chamber having an annular portion opposite to and communicating with the inner one of the valve seats, and said head having a passage for conducting fluid to said inlet chamber extending across said annular discharge chamber to the outside of the latter.

29. In combination, in a compressor, a cylinder member having a bore with a piston reciprocable therein, a cylinder head, and valve mechanism arranged between said cylinder member and head including plates providing coaxial ported plane valve seats struck on different radii from a line including the axis of the cylinder bore, said seats oppositely facing and disposed substantially in the same plane transverse to the cylinder axis, said plates also providing coaxially arranged valve receiving pockets opposite said seats and housing annular valves respectively cooperating with said seats, and valve springs in said pockets, said head having an annular discharge chamber opposite to and communicating with the outer one of said valve receiving pockets and also having nearer the center of said head an inlet chamber having an annular portion opposite to and communicating with the inner one of the valve seats, said head having a passage for the conducting of fluid to said inlet chamber extending across said annular discharge chamber to the outside of the latter, and said cylinder having a lateral discharge opening near its head and communicating with said annular discharge chamber.

FRANK A. HALLECK.